United States Patent Office 3,296,154
Patented Jan. 3, 1967

3,296,154
PREVENTING STATIC BUILDUP IN FOAMABLE
RESIN BEADS WITH CLAY
Thomas H. Ferrigno, Metuchen, N.J., assignor to Minerals & Chemicals Philipp Corporation, Menlo Park, N.J., a corporation of Maryland
No Drawing. Filed Apr. 17, 1963, Ser. No. 273,555
19 Claims. (Cl. 260—2.5)

This invention relates to agents for destaticizing foamable styrene polymer beads and relates also to destaticized foamable styrene polymer beads and the production therefrom of cellular plastic articles by the pre-expansion molding method.

A widely used method for fabricating foamed styrene polymer articles involves subjecting expandable resin beads containing a volatile blowing agent, especially a volatile hydrocarbon such as pentane, to the action of sufficient steam or infrared heating to expand the beads partially. The beads are dried when steam has been employed in the preliminary expansion step and the beads are then blown into molds in which they are steam heated to complete the expansion of the beads. During the second heating step the expanded beads fuse with each other to produce a coherent molded foamed plastic article, such as a sheet. By this process, the starting beads, which are usually particles as small as 10 to 30 mesh, are foamed into a volume which is usually from thirty to sixty times as great as the volume of the beads before expansion.

A serious problem exists in the storage, molding, and transfer of the pre-expanded beads since the beads at this point in the process are highly charged with static electricity and they also contain residual blowing agent. In order to prevent the explosion of residual blowing agent in the pre-expanded beads as a result of static buildup, the beads are conveyed pneumatically through plastic tubes and the molding step is carried out in aluminum molds. However, much of the ancillary equipment is made of iron and steel and such equipment must be grounded. Nevertheless, the danger of explosion or fire still exists in plants producing foamed styrene polymer goods. In addition to the hazard resulting from accumulation of static electricity on the foamable beads, a difficulty inherent in the process is that the pre-expanded polymer beads have a fairly low softening point. As the pre-expanded beads are conveyed through tubes to the molds, they undergo attrition, causing the beads to stick to each other and plug up the tubes.

In order to minimize explosion and fire hazards in plants producing foamed plastics from expandable styrene polymer beads by the pre-expansion technique, it has been suggested to coat the surface of the beads, before the beads are expanded, with an antistatic agent. Organic antistatic materials (which are generally moisture absorptive cationic surface active compounds) are not nearly as effective in preventing accumulation of static electricity in pre-expanded foamable styrene beads as when the antistatic compounds are incorporated with nonfoamable styrene polymer molding powder. Thus, pre-expanded beads that have been surface coated with destaticizing material and are effectively destaticized before preliminary expansion usually show distinct evidence of having accumulated an electrostatic charge after the pre-expansion step.

This difficulty cannot be obviated by incorporating the antistatic material within the beads or by using larger quantities of destaticizing material. Even very small quantities of antistatic agent applied to the bead surface before foaming cause the beads to stick together prior or subsequent to pre-expansion. To obtain a homogeneous cellular plastic, the pre-expanded beads must be packed in the mold in a manner such that there is a minimum void space between the beads in the mold, a condition which cannot be obtained with beads which are sticky. Any sticking of the beads to each other, as will occur when organic antistatic material is coated on the surface of the beads, will prevent packing of the beads with a minimum of voids between the beads and will result in a nonhomogeneous cellular plastic.

Expandable styrene polymer beads that are surface coated with known organic antistatic material therefore present handling and molding problems that would not be encountered in the absence of destaticizing agent. Moreover, many organic antistatic materials tend to soften polystyrene beads and thereby result in loss of blowing agent or the antistatic materials increase the time required to pre-expand or to fuse the expanded beads.

An object of this invention is the provision of destaticized foamable styrene polymer beads that are adapted to be formed into cellular plastics by the pre-expansion method, which beads are free-flowing before and after prefoaming and which undergo normal foaming and fusion.

Another object is an improvement in the method for producing foamed styrene polymer articles from foamable styrene polymer beads whereby the pre-expansion and molding steps are facilitated by the fact that the beads are maintained free-flowing and destaticized throughout the process.

Another important object is the provision of novel particulate antistatic clay compositions adapted for use with expandable styrene beads.

Further objects and advantages of this invention will be readily apparent from the description of this invention which follows.

I have discovered a simple and inexpensive means for adapting antistatic material to the destaticization of foamable polymer beads which renders the destaticized beads free-flowing and nonsticky, and which does not interfere with the foaming and fusion of the foamed beads.

Stated briefly, in accordance with this invention, expandable beads comprising a normally solid nonporous styrene polymer having a volatile organic compound incorporated therein as a foaming agent, are uniformly surface coated with a small quantity of a free-flowing particulate composition consisting essentially of minus 44 micron size particles of a particular type of low surface area, hydrophilic crystalline mineral material, namely, kaolin clay, the particles of said kaolin clay having previously been coated with a small amount of a normally solid cationic surface active agent as an antistatic material, said normally solid cationic surface active agent being employed in amount that is sufficient to cause the kaolin particles to adhere to the surface of the polymer beads and that is insufficient to cause the coated beads to adhere to each other. The normally solid antistatic material employed in carrying out this invention encompasses for the most part cationic surface active nitrogen compounds well known in the art as antistatic material.

In accordance with a preferred form of this invention, the particulate antistatic composition of this invention is formed by surface coating kaolin clay particles with a small amount of a particular type of solid quaternary ammonium derivative; namely, a higher fatty acid amido propyl quaternary nitrogen compound.

An essential feature of this invention resides in the use of kaolin clay as the carrier material for the organic antistatic material since the desired results are not obtained with other finely divided solid materials, including other clays. Another essential feature resides in the use of organic antistatic coating material which is normally a solid. It has been found, surprisingly, that normally liquid organic antistatic material is inoperative for the purpose disclosed since kaolin coated with liquid antistatic material, such as a normally liquid cationic surface active nitrogen compound, is generally ineffective in preventing static buildup of expandable styrene beads or in preventing agglomeration of the beads.

The advantages of the solid particulate destaticizing composition of this invention can be summarized as follows:

(1) The treated beads dry more rapidly after pre-expansion than do untreated beads, thereby permitting higher production rates.

(2) The treated beads have less tendency to agglomerate when conveyed pneumatically through small tubes before foaming since the coated clay agent functions also as a lubricating agent, minimizing the normal sticking of polystyrene beads when they are subjected to attrition and are thereby softened.

(3) The pre-expanded beads have substantially no effect upon the normal foaming and fusion properties of the beads.

(4) The pre-expanded beads are free-flowing and can be charged uniformly into molds to produce homogeneous cellular plastics.

I do not wish to be bound to any theory or hypothesis as to an explanation of the phenomenon that kaolin clay particles coated with normally solid antistatic material is effective for the purposes set forth above in spite of the fact that the antistatic organic material and the kaolin clay are ineffective when each is employed singly. The following, however, would appear to offer a reasonable explanation. From the fact that kaolin clay coated with organic antistatic material adheres well to expandable styrene polymer beads whereas the uncoated clay does not, it can be concluded that the normally solid cationic surface active antistatic material serves a secondary function as an adhesive agent in compositions of this invention, assuring the uniform distribution of micron size clay particles to the surface of the beads before and after pre-expansion. Since the coated clay adheres uniformly to the beads after pre-expansion, the antistatic material will still be uniformly distributed on the bead surface after pre-expansion of the beads and, therefore, the antistatic material will still be effective in dissipating static charge on the beads. While the particular type of clay material that is employed has an extremely large covering area due to its platy structure, it has a very low surface area and a very low base-exchange capacity as compared with other clays. Therefore, the cationic antistatic material is apparently loosely held on the surface of the kaolin clay platelets and available to serve its intended function, rather than being sorbed within pores or complexed with the carrier mineral.

The styrene polymer beads to which this invention is applicable include beads composed of various homopolymers of styrene and interpolymers of styrene containing a preponderating weight percentage of styrene. Reference is made to U.S. Patent No. 2,861,898 to Norbert Platzer for an enumeration of styrene polymers to which this invention is applicable. As mentioned in U.S. Patent No. 2,861,898, the styrene can be replaced in whole or in part by its closely related homologs (e.g., alpha-methylstyrene, o-, m-, and p-methylstyrene, o-, m-, and p-ethylstyrene and 2,4-dimethylstyrene). The term "styrene polymer" as used in the specification and in the claims is intended to encompass the various homopolymers and interpolymers (including copolymers) of styrene that are enumerated in U.S. Patent No. 2,861,898. Especially good results have been obtained with a foamable styrene-acrylonitrile copolymer containing a major proportion of styrene.

As brought out above, the styrene polymer beads employed in carrying out this invention have incorporated therein as a foaming agent an organic solvent which boils at a temperature below which the polymer softens. Preferred foaming agents are aliphatic hydrocarbons or hydrocarbon mixtures which have a boiling point within the range of about 10° C. to about 80° C. Commercially available styrene polymer beads are normally supplied with from 5% to 8% by weight of n-pentane incorporated therein as the blowing agent. However, other volatile organic compounds, such as those enumerated in U.S. Patent No. 2,861,898, can be employed as the blowing agent within the scope of this invention.

In carrying out this invention, a substantially pure grade of well-crystallized kaolin clay is used in forming the composition for preventing static buildup in expandable styrene polymer beads. The term "kaolin clay" as used herein refers to a two-layer hydrous aluminosilicate mineral of the approximate empirical formula $Al_2O_3 \cdot 2SiO_2 \cdot 2H_2O$. The mineral species of kaolin clay is usually kaolinite, although clays composed of nacrite, dickite, and anauxite (all of which are platy minerals characterized by the formula given above) can be used. The kaolin clay employed in carrying out this invention should be refined by removing material that is plus 325 mesh (44 microns) and whole clay or a fine or coarse size fraction of degritted kaolin clay can be used. Kaolin clay having an average particle size within the range of about 0.5 to about 5.0 microns is suitable. All values mentioned herein refer to values determined by the Casagrande sedimentation method described in J. Am. Ceramic Soc., 21, 89–97 (1938). Typical samples of high purity well-crystallized kaolin clay have a low surface area, usually within the range of 5 to 15 square meters per gram, as measured by the B.E.T. nitrogen adsorption method described in Brunauer, Emmett and Teller, JACS, 60, 309 (1938) using molecular size data given by Livingston, JACS, 66, 569 (1944).

As mentioned, the use of kaolin clay is an essential feature of this invention and other clays are not suitable for the purpose. For example, hydratable three-layer clay such as bentonite will swell during steam expansion of the beads and cause undesirable cohesion of the beads. The colloidal form of attapulgite clay, a needlelike clay material, will have the same effect. Other clay materials, including the noncolloidal form of attapulgite clay, are abrasive and, unlike kaolin, they will cause discoloration of the polymer beads as a result of metal pickup by the particles during processing.

A wide variety of antistatic material can be used in carrying out this invention and satisfactory results have been realized employing organic chemicals of comparatively diverse chemical composition. Generally speaking, compounds suitable as antistatic material in carrying out this invention have the following properties.

(1) solid at about 70° F.
(2) substantially insoluble in and nonreactive with the styrene polymer
(3) substantially insoluble in and nonreactive with the blowing agent
(4) stable and nonvolatile at styrene polymer molding and fusion temperatures
(5) possess cationic surface activity
(6) water-wettable (hydrophilic)
(7) contain at least one long-chain hydrophobic aliphatic group having from 8 to 20 carbon atoms, e.g., octyl, decyl, dodecyl, dodecenyl, tetradecyl, hexadecyl, hexadecenyl, octadecyl, octadecadienyl and mixtures thereof.

The preferred normally solid antistatic material employed in carrying out this invention are higher fatty acid amido propyl hydroxyalkyl quaternary nitrogen compounds of the general formula:

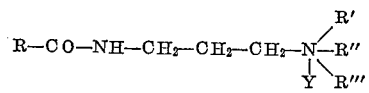

wherein R is an aliphatic group containing at least 8 carbon atoms, R' and R" are members of the group consisting of alkyl and hydroxyalkyl radicals each having from 1 to 3 carbon atoms, inclusive, R''' is a hydroxyalkyl radical having from 1 to 3 carbon atoms, inclusive, and Y is an anion.

As representative members of R in the above formula, the following may be mentioned: octyl, decyl, dodecyl, dodecenyl, tetradecyl, tetradecenyl, hexadecyl, hexadecenyl, octadecyl, octadecenyl, and octadecadienyl. R may also constitute mixture of long-chain aliphatic radicals such as those found in natural fatty acid mixtures obtained, for example, from coconut oil, cottonseed oil, soybean oil, or lard oils. Thus, for example, there may be used tallowamines (derived from tallow and in which "tallow" comprises a mixture of the following radicals: dodecyl, tetradecyl, tetradecenyl, hexadecyl, hexadecenyl, octadecyl, octadecenyl, octadecadienyl, and eicosyl); cocoamines (derived from coconut oil and in which "coco" comprises a mixture of hexyl, octyl, decyl, dodecyl, tetradecyl, hexadecyl, octadecyl, octadecenyl, and octadecadienyl radicals); and soya-amines (derived from soybean oil and in which "soya" comprises a mixture of hexadecyl, octadecyl, eicosyl, octadecenyl, octadecadienyl, and octadecatrienyl radicals). Species of suitable higher fatty acid amido propyl hydroxyalkyl quaternary nitrogen compounds include oleylamidopropylethyldihydroxyethylammonium chloride,
octadecadienylamidopropyldiethyl-B-hydroxymethylammonium bromide,
stearylamidopropyldimethyl-B-hydroxyethylammonium nitrate,
stearylamidopropyldipropyl-B-hydroxypropylammonium chloride,
soyaamidopropyldimethyl-B-hydroxyethylammonium chloride,
cocoamidopropyldimethyl-B-hydroxyethylammonium hydroxide.

The preparation of suitable higher fatty acid amido propyl hydroxyalkyl quaternary nitrogen compounds is described in U.S. Patent No. 2,626,876 to Joseph J. Carnes.

The following types of polar organic compounds can also be used:

Normally solid tertiary amines having as substituents a single alkyl group having at least 8 carbon atoms, preferably between 12 and 18 carbon atoms, and two polyoxyethylene groups wherein the ratio of total ethoxy groups to alkyl group is from 2 to 50:1, the structure of the ethoxylated amines being set forth in U.S. Patent No. 2,819,210; normally solid ethoxylated amides analogous to the afore-mentioned ethoxylated amines and exemplified by tallow amide ethoxylated with 25 mols of ethylene oxide; normally solid acid salts of N-aliphatic alkylene (especially trimethylene) diamines wherein the aliphatic group contains at least 8 carbon atoms, and preferably 12 to 18 carbon atoms, as described in U.S. Patent No. 2,852,406 and exemplified by N-tallow trimethylene diamine dioleate; normally solid fatty acid amides, fatty acid alkanolamides, amines and amine salts.

The organic destaticizing agent can be coated on the finely divided particles of kaolin clay by coating procedures well known to those in the art. Since the effectiveness of the coated solid particles depends on the uniformity of the distribution of the organic coating agent on the clay particles, the particular coating procedure that is used must assure the deposition of a substantially uniform coating of the organic material on the surfaces of individual clay particles. One recommended coating procedure is to pass the ingredients through a fluid energy mill (e.g., a jet mill) under conditions such that the organic material is melted and deposited uniformly on the clay particles. Alternatively, the clay and molten organic destaticizing agent can be mixed in a ball mill. Satisfactory results can also be realized by slurrying the clay and organic destaticizing material in a vehicle which boils at a temperature below which the organic destaticizing material is decomposed. This vehicle can be water, an organic liquid or mixtures thereof. The slurry is dried at a temperature below which the organic material decomposes and then ground to micron sized particles. This procedure is especially applicable to normally solid antistatic material that is supplied commercially as a solution, e.g., stearylamidopropyldimethyl-B-hydroxyethylammonium nitrate, which is supplied commercially as a 50% solution of the solid quaternary ammonium salt in a mixture of water and alcohol. Excellent results have been obtained by agitating dry kaolin at high speed and dripping molten organic antistatic material into the mass of clay while the clay is being agitated.

The quantity of normally solid organic antistatic material that is coated on the kaolin clay must be sufficient to assure adhesion of the coated clay to the polymer beads. Therefore, the required proportion of coating agent to filler particles will decrease proportionately with the average particle size of the clay. With kaolin clay having an average particle size of 0.5 to 5 microns, coating material will be employed in amount within the range of 1% to 10%, preferably from 2% to 7%, of the moisture free weight of the clay. Higher concentrations of antistatic material may be required with clay having a finer average particle size.

To produce destaticized foamable polystyrene beads which do not stick before or after pre-expansion, the coated kaolin clay composition is employed in amount within the range of about 1/10% to about 2%, and preferably in amount within the range of 1/2% to 1 1/2%, based on the weight of the beads (inclusive of the weight of blowing agent contained in the beads). When employed in amount appreciably less than 1/2%, the effectiveness of the clay-containing composition in preventing static buildup in the beads is diminished and, moreover, the coated beads will not dry as rapidly as when higher concentrations of coated clay are used. Quantities of coated clay in excess of about 1 1/2% make the expandable beads undesirably dusty in most instances and also impair the properties of the molding. The free moisture of the coated kaolin clay should be less than 1% of the weight of the coated clay and is preferably less than 0.5% of the weight of the coated clay. Free moisture is determined by heating a material to essentially constant weight at 225° F.

To deposit the clay composition on the expandable styrene polymer beads, the beads can be tumbled with the coated clay at ambient temperature or at a temperature below which the foaming agent has appreciable vapor pressure. Normally, a tumbling period of only a few minutes will suffice. The bead coating step can be carried out in any agitated equipment, especially tumbling equipment, such as in a horizontal drum rotating about its axis.

The following example is given to illustrate the destaticization of expandable styrene beads, in accordance with this invention.

Commercial expandable polystyrene beads (30 to 40 mesh) containing 5% to 8% pentane as the blowing agent were used in the example. Portions of the beads were tumbled for 30 minutes at ambient temperature with kaolin clay or with kaolin clay which had previously been coated with normally solid antistatic material identified in the accompanying table. The kaolin clay was a coarse size fraction of degritted Georgia kaolin clay having an average particle size of 4.8 microns (equivalent spherical diameter) and having a free moisture content of about 0.2% by weight. All coating (except for the coating with antistatic material that was supplied as a solution) was carried out by melting antistatic material at a temperature below which the material decomposed and slowly dripping the material into a charge of the kaolin clay while the clay was being subjected to high shear agitation in a Waring Blendor. In the case of stearylamidopropyldimethyl-B-hydroxyethylammonium nitrate which was supplied as a 50% solution in a mixture of alcohol and water, the solution was dripped onto the clay in a Waring Blendor, and the mixture dried to remove all solvent at an oven temperature of 160° F. and then pulverized. As a control, uncoated clay was tumbled with a portion of the expandable polystyrene beads.

In all cases, the clay treated expandable beads were placed in a wire basket and pre-expanded in a steam atmosphere to a bulk density of about 2 pounds per cubic foot. The prepuffs were placed in a paper tray to air dry and then examined for static buildup and agglomeration. The dried prepuffs were gravity fed into a closed 234 ml. aluminum container provided with drilled holes through which a steam probe was inserted to heat and fuse the charge. A steam pressure of about 10 p.s.i.g. was employed.

To test storage stability of expandable styrene polymer beads with and without clay additives, portions of the beads with and without clay additives were stored in closed containers for two weeks and then partially expanded, fused, and evaluated as described above.

The results for static buildup, agglomeration, and flowability of aged and unaged partially expanded polystyrene beads that were treated before partial expansion with clay materials are summarized in the accompanying table.

The results for unaged beads which are summarized in the accompanying table show that kaolin clay coated with normally solid organic antistatic material improved the flowability and prevented agglomeration and static buildup in the pre-expanded polystyrene beads whereas sorbed antistatic agent and also normally elastic gel material, is intimately incorporated into the resin by mixing the solid carrier with sorbed liquid antistatic material and gel material with resin powder. The gel is used as an essential ingredient to prevent the liquid antistatic material from impairing the properties of the molded resin. In contrast with the teachings of U.S. Patent No. 2,933,022 which is directed to the production of nonporous solid resin molded articles from resins in the form of powder, this invention is directed to the production of cellular products from resins in the form of expanded beads. In further contrast with the patented compositions which contain a high surface area solid carrier, liquid antistatic material and gel, antistatic compositions of the present invention consist essentially of low surface area solid carrier material (kaolin clay) and normally solid organic antistatic material, the solid antistatic material serving a secondary and essential function as an adhesive to cause the platy clay particles to adhere to the polymer beads after the beads are expanded.

I am also aware that U.S. Patent No. 2,861,898 to Norbert Platzer relates to the use of a water-insoluble aluminum silicate coating on foamable styrene polymer beads for the purpose of assuring a fine pore size in the aged extruded cellular polymer foam. It will be readily apparent to those skilled in the art that the teachings of this patent are limited to resin foams produced by extrusion and are not applicable to the pre-expansion foaming process.

TABLE.—DESTATICIZATION OF EXPANDABLE POLYSTYRENE BEADS WITH CLAY COATED WITH NORMALLY SOLID ORGANIC ANTISTATIC MATERIAL

| | Composition of Destaticizing Composition [3] | | | | | | |
|---|---|---|---|---|---|---|---|
| | Control (no antistatic material) | Kaolin clay, uncoated | Kaolin coated with 5% by wt. stearylamido propyldimethyl-B-hydroxyethyl ammonium nitrate | Kaolin coated with 5% by wt. technical soya fatty acid amide, 98% | Kaolin coated with 5% by wt. hydrogenated tallow amide, ethoxylated with 5 mols of ethylene oxide | Kaolin coated with 5% by wt. N-tallow-1,4 propylene diamine dioleate | Kaolin coated with 5% by wt. 9-amino, 10-hydroxy stearyl nitrate |
| Pre-expanded 20 seconds: | | | | | | | |
| Static on dry beads [1] | Extensive | Moderate | None | Slight | Slight | None | Slight. |
| Agglomeration, percent | 95 | 70 | do | 5 | 2 | do | 5. |
| Flowability [2] | Fair | Poor | Excellent | Very good | Excellent | Excellent | Very good to excellent. |
| 3 minute steam probe molding, 3 pcf., fusion | Good | Retarded | Good | Good | Good | Good | Good. |
| Coated expandable beads, 2 weeks age, pre-expanded 25 seconds: | | | | | | | |
| Static | Moderate | Slight | None | Slight | Very slight | Very slight | Very slight. |
| Agglomeration, percent | 70 | 5 | 5 | 20 | 5 | 5 | 10. |
| Flowability | Good | Excellent | Excellent | Excellent | Excellent | Excellent | Excellent. |
| Dustiness | None | Extensive | Slight | Moderate | Slight | Moderate | Slight. |

[1] Glass rod charged by rubbing with dry cloth; static buildup reported as amount of beads clinging to charged rod.
[2] Beads poured from paper bag.
[3] All coated and uncoated clay used at level of 1% of the weight of beads.

the uncoated kaolin clay impaired flowability of the pre-expanded beads and had only a moderate effect on agglomeration and static buildup. The results show that the clay coated with normally solid antistatic material did not retard fusion of the expanded beads as did the clay that was not coated with solid organic antistatic material.

Results for the aged beads, also given in the accompanying table, show that all compositions of this invention were superior to control beads without any clay coating. While the effectiveness of uncoated kaolin in destaticizing the beads and in improving their flowability was improved by aging, nevertheless, after aging, the expandable beads were too dusty to permit their use with the beads.

I am aware that U.S. Patent No. 2,993,022 to Myron A. Coler teaches the use of particulate material as a solid carrier for organic antistatic material adapted to be employed in the production of molded thermoplastic resin, such as polystyrene. The carrier material, containing

I claim:
1. A destaticized foamable composition in the form of free-flowing, nonadherent beads comprising:
   (a) a normally solid nonporous styrene polymer in bead form, said polymer (b) having incorporated therein a volatile organic compound as a foaming agent and (c) having uniformly deposited on the surface of said beads an adherent coating consisting essentially of particles of crystalline kaolin clay, the particles of said kaolin clay having previously been coated with a small amount of a normally solid cationic nitrogeous surface active compound as an antistatic material for said styrene polymer, said surface active compound containing a long-chain hydrocarbon radical containing 8 to 20 carbon atoms and derived from a fatty acid, the cationic radical of said nitrogenous surface active compound being selected from the group consisting of amine, amide and quaternary ammonium, said cationic surface active compound being stable and nonvolatile at styrene polymer molding and fusion temperatures.

2. The composition of claim 1 wherein said adherent coating (c) is employed in amount sufficient to cover substantially completely the surface of said polymer (a) and said cationic surface active compound is coated on said particles of kaolin clay in an amount that is sufficient to cause said kaolin clay to adhere to the surface of said polymer but is insufficient to cause beads of said polymer to adhere to one another before they are completely expanded.

3. The composition of claim 1 wherein said adherent coating (c) is employed in amount within the range of 1/10% to 2%, based on the weight of said styrene polymer bead and said cationic surface active compound is employed in amount within the range of 1% to 10%, based on the weight of said kaolin clay.

4. The composition of claim 1 wherein said adherent coating (c) is employed in amount within the range of ½% to 1½%, based on the weight of said styrene polymer, and said cationic surface active compound is employed in amount within the range of 2% to 7%, based on the weight of said kaolin clay.

5. The composition of claim 1 wherein said cationic surface active compound is further characterized by the fact that it contains an aliphatic radical derived from a fatty acid and having from 12 to 18 carbon atoms.

6. The composition of claim 1 wherein said cationic surface active compound is a higher fatty acid amido propyl hydroxyalkyl quaternary nitrogen compound.

7. The composition of claim 1 wherein said cationic surface active compound is stearylamidopropyldimethyl-B-hydroxyethylammonium nitrate.

8. The composition of claim 1 wherein said styrene polymer consists predominantly of a homopolymer of styrene.

9. A destaticized foamable composition in the form of free-flowing, nonadherent beads comprising:
(a) a normally solid nonporous styrene polymer in bead form, said polymer in bead form
(b) having incorporated therein a volatile organic compound as a foaming agent, and
(c) having uniformly deposited on the surface thereof from 1/10% to 2% by weight of an adherent coating, said coating consisting essentially of minus 44 micron particles of kaolin clay, the particles of said kaolin clay having previously been coated with from 1% to 10% by weight of a normally solid cationic nitrogenous surface active compound as an antistatic material for said styrene polymer, said surface active compound containing a long-chain hydrocarbon radical containing 8 to 20 carbon atoms and derived from a fatty acid, the cationic radical of said nitrogenous surface active compound being selected from the group consisting of amine, amide and quaternary ammonium, said cationic surface active compound being stable and nonvolatile as styrene polymer molding and fusion temperatures.

10. The composition of claim 9 wherein said adherent coating (c) is present in amount within the range of ½% to 1½%, based on the weight of said styrene polymer and said cationic surface active compound is present in amount within the range of 2% to 7%, based on the weight of said kaolin clay.

11. The composition of claim 10 wherein said cationic surface active compound is further characterized by the fact that it contains an aliphatic radical derived from a fatty acid and having from 12 to 18 carbon atoms.

12. The composition of claim 10 wherein said cationic surface active compound is a higher fatty acid amido propyl hydroxyalkyl quaternary nitrogen compound.

13. The composition of claim 12 wherein said cationic surface active compound is stearylamidopropyldimethyl-B-hydroxyethylammonium nitrate.

14. In the production of molded foamed plastic goods from normally solid nonporous beads of thermoplastic styrene polymer having a volatile hydrocarbon incorporated therein as a foaming agent by a method which comprises heating said beads in a manner such as to cause partial expansion of said beads and further heating the partially expanded beads in a mold in a manner such as to complete the expansion of the beads and to effect the fusion of the expanded beads, the improvement which consists in:
agitating said styrene polymer beads containing foaming agent while said beads are solid and nonporous with from 1/10% to 2% by weight of particulate coating materials so as to form an adherent layer of coating material on surfaces of said beads, said coating material consisting essentially of minus 44 micron particles of kaolin clay and, as a coating on said particles of kaolin clay from 2% to 7%, based on the weight of said particles of kaolin clay, of a normally solid nitrogenous cationic surface active compound as an antistatic agent for said styrene polymer, said cationic surface active compound containing a long-chain hydrocarbon radical containing 8 to 20 carbon atoms and derived from a fatty acid, the cationic radical of said surface active compound being selected from the group consisting of amine, amide and ammonium, said surface active compound being stable and nonvolatile at styrene polymer molding and fusion temperatures, whereby said styrene polymer beads thus coated are maintained free-flowing, nonadherent and effectively destaticized before and after undergoing partial expansion.

15. In the production of molded foamed polystyrene goods from normally solid nonporous beads of polystyrene having a volatile hydrocarbon incorporated therein as a foaming agent by a method which comprises heating said beads containing foaming agent in a manner such as to cause partial expansion of said beads and further heating the partially expanded beads in a mold in a manner such as to complete the expansion of the beads and to effect the fusion of the expanded beads, the improvement which consists in:
agitating the polystyrene beads containing foaming agent, before they are heated and are thereby expanded, with from ½% to 2% by weight of particulate coating material so as to cause said particulate coating material to adhere as a surface layer on said beads, said particulate coating material consisting essentially of minus 44 micron particles of kaolin clay, the particles of said kaolin clay having previously been uniformly coated with from 1% to 10% by weight of a normally solid cationic nitrogenous surface active compound as an antistatic material, said cationic surface active compound containing a long-chain hydrocarbon radical containing 8 to 20 carbon atoms and derived from a fatty acid, the cationic radical of said surface active compound being selected from the group consisting of amine, amide and ammonium, whereby said beads are both nonsticky and effectively destaticized before and after they are partially expanded.

16. A dry free-flowing composition adapted for use as a material to prevent agglomeration and static buildup in foamable polystyrene beads, said composition consisting essentially of minus 44 micron kaolin clay particles the surface of which are uniformly coated with and in direct contact with from 1% to 10% by weight of a normally solid cationic surface active compound containing a long-chain hydrocarbon radical containing 8 to 20 carbon atoms and derived from a fatty acid, the cationic radical of said surface active compound being selected from the group consisting of amine, amide and ammonium, said cationic surface active compound being stable and nonvolatile at styrene polymer molding and fusion temperatures.

17. A dry free-flowing particulate material consisting essentially of minus 44 micron particles of kaolin clay the surfaces of which are uniformly coated with and in direct contact with from 1% to 10% by weight of a quaternary ammonium compound of the general formula:

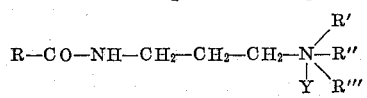

wherein R is an aliphatic containing at least 8 carbon carbon atoms, R' and R'' are members of the group consisting of alkyl and hydroxyalkyl radicals each having from 1 to 3 carbon atoms, inclusive, R''' is a hydroxyalkyl radical having from 1 to 3 carbon atoms, inclusive, and Y is an anion.

18. The composition of claim 17 in which said quaternary ammonium compound is stearylamidopropyl-dimethyl-B-hydroxyethylammonium nitrate.

19. The composition of claim 18 in which said clay is coated with from 2% to 7% by weight of said quaternary compound.

References Cited by the Examiner
UNITED STATES PATENTS

| | | | |
|---|---|---|---|
| 2,911,381 | 11/1959 | Roth | 260—2.5 |
| 2,993,022 | 7/1961 | Coles | 117—100 |
| 3,154,604 | 10/1964 | McMillan | 117—100 |

FOREIGN PATENTS 921,032   3/1963   Great Britain.

MURRAY TILLMAN, *Primary Examiner.*

N. F. OBLON, *Assistant Examiner.*